US006021648A

United States Patent [19]

Zonneveld et al.

[11] Patent Number: 6,021,648

[45] Date of Patent: Feb. 8, 2000

[54] METHOD OF MANUFACTURING A FLAT GLASS PANEL FOR A PICTURE DISPLAY DEVICE

[75] Inventors: Maarten H. Zonneveld; Pieter J. Q. Van Voorst Vader; Jacob Brinkert, all of Eindhoven, Netherlands

[73] Assignee: U. S. Philips Corporation, New York, N.Y.

[21] Appl. No.: 09/062,168

[22] Filed: Apr. 17, 1998

[30] Foreign Application Priority Data

Sep. 29, 1997 [EP] European Pat. Off. .............. 97202979

[51] Int. Cl.[7] .............................. C03C 8/00

[52] U.S. Cl. .............................. 65/33.5; 65/33.6; 65/34; 65/36; 65/42; 65/43; 65/111; 65/155

[58] Field of Search .............................. 65/33.5, 33.6, 65/34, 36, 42, 43, 111, 155

[56] References Cited

U.S. PATENT DOCUMENTS

| | | | |
|---|---|---|---|
| 3,995,941 | 12/1976 | Nagahara et al. | 65/43 |
| 4,130,408 | 12/1978 | Crossland et al. | 65/43 |
| 4,613,312 | 9/1986 | Mammach | 445/25 |
| 4,664,689 | 5/1987 | Davis | 65/434 |
| 4,666,548 | 5/1987 | Eto et al. | 65/43 |
| 5,167,687 | 12/1992 | Muragishi et al. | 65/36 |
| 5,807,154 | 9/1998 | Watkins | 65/43 |
| 5,855,637 | 1/1999 | Yakou et al. | 65/36 |
| 5,855,638 | 1/1999 | Demars | 65/34 |
| 5,868,811 | 2/1999 | Khan et al. | 65/36 |

FOREIGN PATENT DOCUMENTS

| | | | |
|---|---|---|---|
| 3343951 | 6/1985 | Germany | 65/43 |
| 6-260090 | 9/1994 | Japan | 65/36 |
| 9729506 | 8/1997 | WIPO | H01J 31/12 |

*Primary Examiner*—Stanley S. Silverman
*Assistant Examiner*—Michael P. Colaianni
*Attorney, Agent, or Firm*—F. Brice Faller

[57] ABSTRACT

A flat glass panel 1 for a picture display device of the flat type, is formed by two glass cover plates (3, 5) with at least one glass plate (4, 4', 4", . . . ) between them, and a vitreous frit (8) between the cover plates along the outer edges of the cover plates so as to obtain a box-type glass panel in which a channel structure is present. After heating to the melting temperature of the frit (8), the panel is cooled down to a transitional temperature of the frit, while the space between the cover plates is partly exhausted during the cooling-down phase at a temperature which lies between the melting temperature and the transitional temperature of the frit. Then the temperature is kept constant at approximately the transitional temperature until the frit has become undeformable, said space (13) between the cover plates (3, 5) being fully evacuated then. Finally, cooling-down continues to room temperature, and the space (13) inside the panel is hermetically sealed off.

5 Claims, 3 Drawing Sheets

METHOD OF MANUFACTURING A FLAT GLASS PANEL FOR A PICTURE DISPLAY DEVICE

BACKGROUND OF THE INVENTION

The invention relates to a method of manufacturing a flat glass panel for a picture display device of the flat type. Such devices are used for displaying monochromatic or color pictures in vacuum tubes, plasma display panels (PDP), and plasma-addressed liquid crystal display devices (PALC), as described in WO-A-97/29506 (U.S. Pat. No. 5,886,463). The panel comprises two cover plates, i.e. an at least transparent front wall and a rear wall, both made of glass, between which at least one glass plate is present. A channel structure is present inside the panel, whose channels are bounded by the rear wall and the glass plate.

OBJECTS AND SUMMARY OF THE INVENTION

It is an object of the invention to manufacture a glass panel such that after the manufacture of the glass panel a minimum amount of residual mechanical stresses remains in the material owing to thermal and mechanical loads to which the panel was subjected during its manufacture.

The method of manufacturing a glass panel as mentioned above is characterized by the following steps:

- providing at least one glass plate between two glass cover plates,
- providing a vitreous frit between the cover plates along the outer edges of the cover plates so as to obtain a box-type glass panel in which a channel structure is present,
- heating the glass panel to a melting temperature of the frit,
- cooling down of the panel to a transitional temperature of the frit, a space between the cover plates being partly evacuated during the cooling-down process at an intermediate temperature which lies between the melting temperature and the transitional temperature of the frit,
- keeping the temperature constant at approximately the transitional temperature until the frit has become undeformable, during which said space between the cover plates is entirely evacuated,
- cooling down of the panel to room temperature, and
- sealing off the panel in a gas-tight manner.

It is especially the cooling-down in the range between the melting temperature of the frit and the transitional temperature of the frit, i.e. the temperature at which the frit passes fully into the solid glass phase, which must be carried out in a very careful and controlled manner. Stresses can readily arise in the glass during this phase, especially thermal stresses, which may result in residual stresses later. The partial evacuation of the glass panel between the melting temperature and the transitional temperature of the frit, when the frit is still somewhat viscous, has the object of pulling the cover plates towards one another (by suction), so that they are pressed tightly against the interposed glass plate(s) so as to obtain a well-sealed channel structure and to minimize residual stresses as much as possible. The underpressure ensures an even pressure distribution on the panel portions. This renders it unnecessary to press the cover plates towards one another by means of additional weights.

A method which is preferably used is characterized in that the heating of the panel is obtained by means of contact heating through the application of flat heating plates on the two cover plates. Such heating plates, preferably aluminum plates in which heating elements (coax cables) are provided, have an even surface temperature, i.e. the temperature differences over the surface are small. A fast heating-up of the panel is obtained by bringing this surface into good thermal contact with the cover plates.

Cooling-down to room temperature proceeds progressively slowly. The risk, however, of undesirable stresses arising also becomes smaller at lower temperatures. A faster cooling-down in the final range can shorten the manufacturing time considerably. To achieve this, helium cooling is used during the cooling-down phase below a temperature of approximately 150° C. Helium has a very high thermal conductivity. This renders it possible to remove heat quickly from the panel. The advantage of the use of contact heating over heating in, for example, a convection oven is that the total manufacturing time is much shorter, especially because the cooling-down phase can take place much more quickly. In addition, a much better temperature control is possible in the case of contact heating.

DESCRIPTION OF THE PREFERRED EMBODIMENTS

Figure 1:
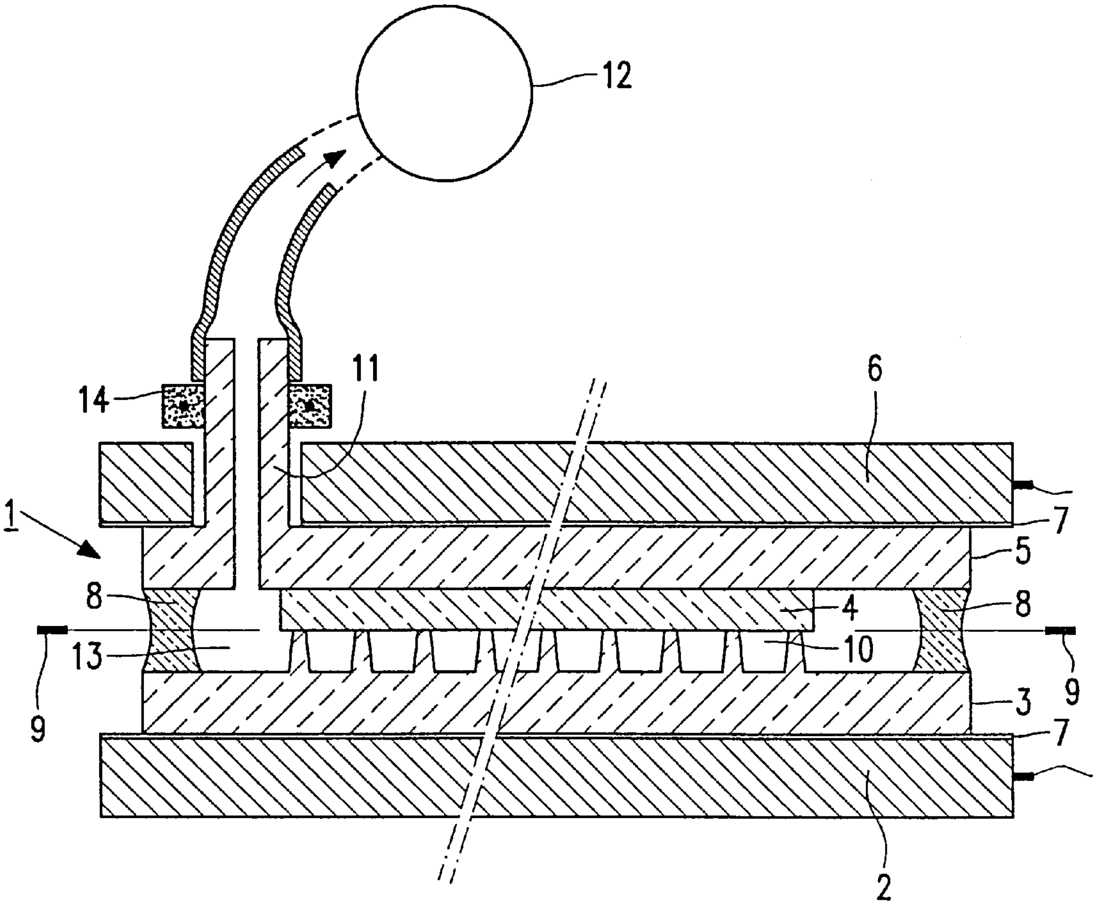
FIG. 1 shows a first arrangement for the manufacture of a glass panel.
Figure 2:
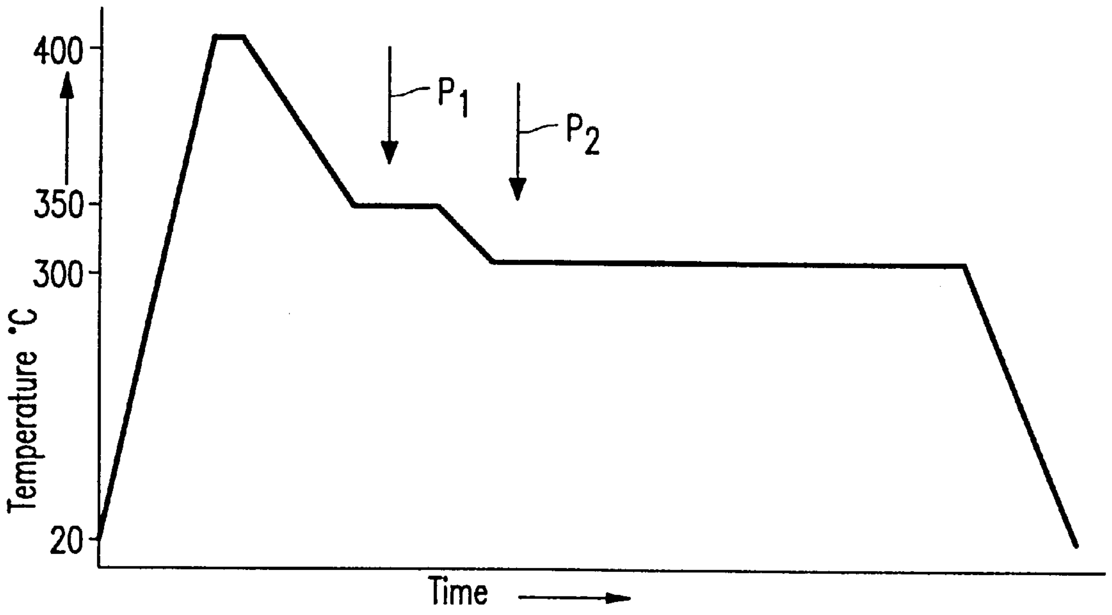
FIG. 2 is a temperature-time diagram relating to the manufacture of the glass panel.

FIG. 1 diagrammatically shows an arrangement for the manufacture of a flat glass panel for a picture display device of the flat type. A cover plate 3 of glass is laid on a heating plate 2. A glass plate 4 is placed on the cover plate, and on top of that another cover plate 5, also made of glass. A second heating plate 6 is placed on the cover plate 5. The glass plate 4 is slightly smaller than the cover plates 3, 5. Any small differences in shape between the heating plates and the cover plates can be accommodated by a flexible intermediate layer 7 of a material having a good thermal conductivity. A vitreous frit 8 is provided between the cover plates 3 and 5, along the outer edges thereof. Electrical connection wires 9 for inter alia an electron source, which is not shown, are passed to the exterior through the frit. The cover plates 3, 5 together with the glass plate 4 form the flat glass panel 1 to be manufactured. Inside the panel there is a channel structure 10. This, however, is not shown in any detail, neither is the electron source. Reference is made to the cited document WO-A-97/29506 for a description of these elements. An exhaust tube 11 is attached to the cover plate S and is connected to a vacuum pump 12 so as to evacuate the space 13 inside the panel. A heating element 14 is provided around the exhaust tube 11. The manufacture of the panel further proceeds as follows: The heating plates 2 and 6 are heated to a temperature at which the glass frit melts. The 20 glass frit used is, for example, LS1301 of NEG. The melting temperature of this glass frit lies at approximately 450–470° C. The heating-up phase takes some 45 to 60 minutes. After the melting temperature of the frit has been reached, the frit is kept at this melting temperature for a short period, for example 15 minutes, so as to obtain a satisfactory temperature homogeneity of the glass frit. The cooling-down phase can now start. When the temperature of the frit has fallen to approximately 350° C., (see arrow $P_1$ in FIG. 2), the vacuum pump 12 is switched on. The frit is still somewhat viscous at this temperature, but it does seal off the outer edges of the panel. The underpressure arising in the inner space 13 of the panel pulls the cover plates 3 and 5 towards one another by suction. The glass plate 4 is securely clamped in between the cover plates 3 and 5 as a result of this, so that the channels of the channel structure formed between the glass plate 4 and the cover plate 3 are well sealed, such that minimized residual stresses occur. A partial underpressure is provided, for example $0.9\times10^5$ Pa, in this phase. A stronger vacuum could suck frit material to the inside, whereby the sealing could become damaged or even destroyed. Then the cooling phase continues down to a transitional temperature of the frit at which the frit passes fully into the solid glass phase. The frit has now become undeformable. The panel is now fully evacuated at this temperature (see arrow $P_2$ in FIG. 2). It takes approximately 3 hours to obtain a full evacuation. The panel is subsequently cooled down to room temperature.

Finally, the heating element 14 around the exhaust tube 11 is switched on and the exhaust tube is closed by fusion.

Figure 3:
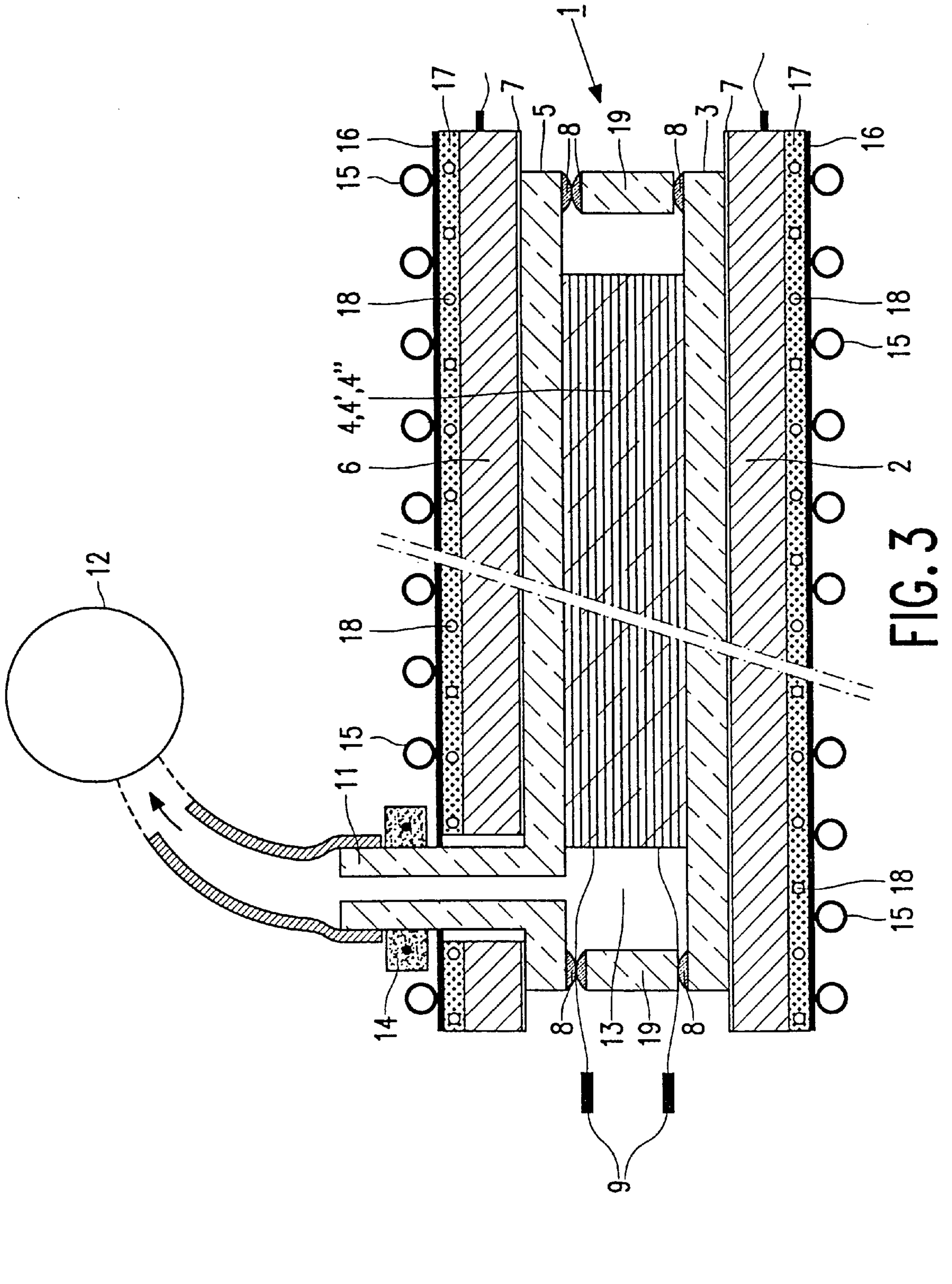
FIG. 3 shows a second arrangement for the manufacture of a glass panel.

Subsequent cooling down to room temperature, however, proceeds progressively more slowly. To shorten the total manufacturing time of the panel, the cooling phase may be quickened by forced cooling, for example, air cooling in heat sinks of the heating plates. A better method is indicated in FIG. 3. Here a cooling member is provided on the heating plates 2, 6, comprising a number of cooling pipes 15 fastened on a copper plate 16 and an insulation layer 17 in which a number of nozzles 18 are accommodated. The insulation layer 17 with the nozzles 18 will lie between the copper plate 16 with the cooling pipes 15 and the heating plate 3, 5. During the heating phase, the cooling member has an adverse effect. The insulation 17 is provided for limiting this to a 15 certain extent. During the cooling-down phase, at approximately 150° C., a liquid, for example water, is caused to flow through the pipes 15. At the same time, helium is injected into the insulation layer through the nozzles 18, so that the insulation layer is impregnated with cold helium. The thermal conductivity of helium is approximately 5 times that of air.

In the example shown in FIG. 3, the glass panel is built up from a large number of thin, flat glass plates 4, 4', 4", . . . , in which a channel structure comprising many channels is present. Since the distance between the cover plates 3 and 5 is greater as a result of this than in the example of FIG. 1, spacer elements 19 made of glass are provided along the outer edges. The frit in that case is present between the spacer elements 19 and the respective cover plates 3 and 5.

We claim:

1. A method of manufacturing a flat glass panel for a picture display device, which method comprises the following steps:

providing at least one glass plate between two glass cover plates, providing a vitreous frit between the cover plates along the outer edges of the cover plates so as to obtain a box-type glass panel in which a channel structure is present, heating the glass panel to a melting temperature of the frit, cooling down of the panel to a transitional temperature of the frit, said transitional temperature being the temperature at which the frit passes fully into the solid glass phase, partly evacuating a space between the cover plates, during the cooling down of the panel, at an intermediate temperature which lies between the melting temperature and the transitional temperature of the frit, keeping the temperature constant at approximately the transitional temperature until the frit has become undeformable, whereupon said space between the cover plates is entirely evacuated, cooling the panel to room temperature, and sealing off the panel in a gas-tight manner.

2. A method as claimed in claim 1, characterized in that the heating of the glass panel is obtained by means of contact heating of the cover plates.

3. A method as claimed in claim 1, characterized in that helium cooling is used for cooling the panels below approximately 150° C.

4. A method as in claim 1 wherein the temperature is kept constant at the intermediate temperature while the space between the cover plates is partly evacuated.

5. A method as in claim 1 wherein the space between the cover plates is fully evacuated while the temperature is kept constant at the transitional temperature.

* * * * *